No. 727,650. PATENTED MAY 12, 1903.
C. LINDE.
PROCESS OF PRODUCING LOW TEMPERATURES, THE LIQUEFACTION OF GASES, AND THE SEPARATION OF THE CONSTITUENTS OF GASEOUS MIXTURES.
APPLICATION FILED JULY 9, 1895.
NO MODEL.
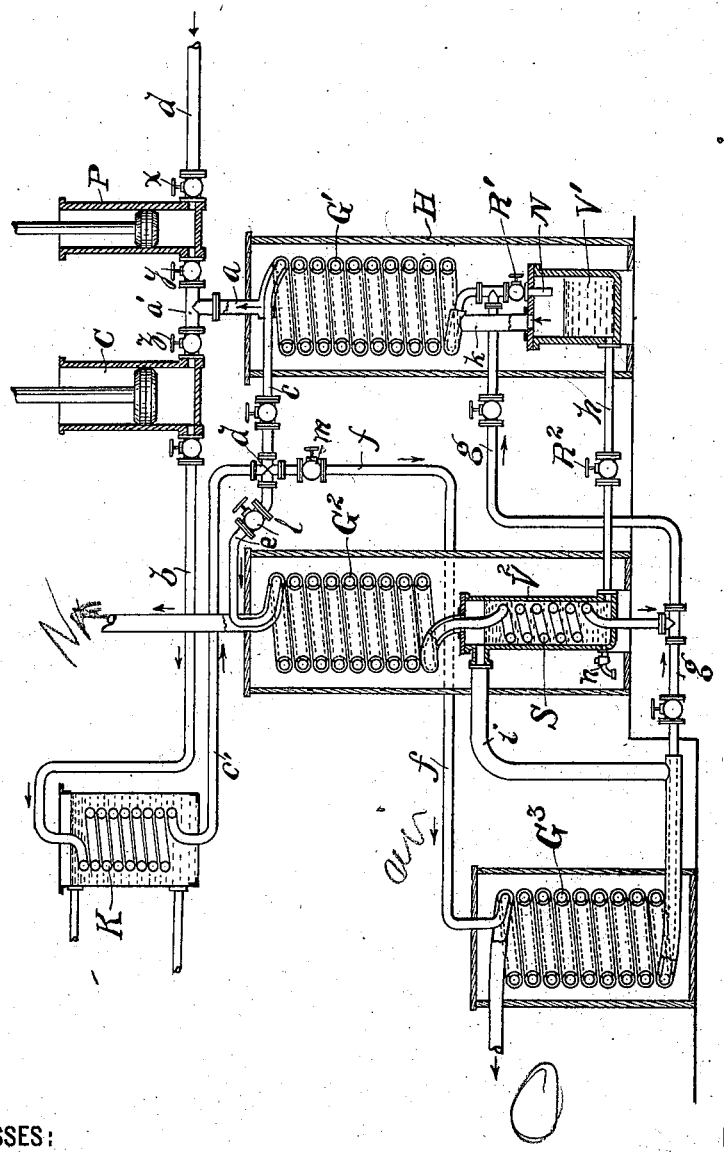
WITNESSES:
Chas. W. Thomas.
Geo. W. Eisenbraun
INVENTOR:
Carl Linde,
BY
ATTORNEY.

No. 727,650.  
Patented May 12, 1903.

UNITED STATES PATENT OFFICE.

CARL LINDE, OF MUNICH, GERMANY, ASSIGNOR OF ONE-THIRD TO CHARLES F. BRUSH, OF CLEVELAND, OHIO.

PROCESS OF PRODUCING LOW TEMPERATURES, THE LIQUEFACTION OF GASES, AND THE SEPARATION OF THE CONSTITUENTS OF GASEOUS MIXTURES.

SPECIFICATION forming part of Letters Patent No. 727,650, dated May 12, 1903.

Application filed July 9, 1895. Serial No. 555,371. (No specimens.)

*To all whom it may concern:*

Be it known that I, CARL LINDE, professor, a subject of the King of Bavaria, residing at Munich, in the Kingdom of Bavaria, German Empire, have invented new and useful Improvements in Processes of Producing Low Temperatures, the Liquefaction of Gases, and the Separation of the Constituents of Gaseous Mixtures, of which the following is a specification.

My invention relates to improvements in processes for producing very low temperatures, especially for the purpose of liquefying gases or mixtures of the same, such as atmospheric air, and also in separating the constituents of gaseous mixtures. The method of separating the components of atmospheric air is based upon a fact well known to physicists—that oxygen, although having a boiling-point higher than nitrogen, can only be liquefied simultaneously with the nitrogen or part of it, but that the nitrogen is first evaporated on volatilizing the liquefied mixture, so that the mixture will become richer in oxygen the longer the volatilization is continued.

The liquefaction of gases, such as atmospheric air, has hitherto been carried out by producing successive liquefaction and volatilization of liquids of gradually-increasing volatility, such as carbonic acid, nitrous oxid, ethylene, and the like. This method, however, has not proved capable of practical application for the purpose of attaining such low temperatures as that required for liquefying atmospheric air. My process for reaching such low temperatures is based upon the discovery made by Joule and Thomson more than forty years ago that atmospheric air when discharged through a valve from a space under high pressure into a space maintained at a lower pressure by causing the gas to pass off will have a lower temperature, the decrease $(T-T')$ of the temperature in degrees centigrade being expressed by the formula $T'-T = \frac{p^2-p'}{4} \frac{(289)^2}{T}$, where $p^2$ is the higher pressure, $p'$ the lower pressure in atmospheres, $T$ the initial absolute temperature at higher pressure $p^2$, and $T'$ the absolute temperature at lower pressure $p'$. For the difference $(p^2-p')$ of pressure of fifty atmospheres the difference of temperature is about 13° centigrade for $T=283°$, 14° for $T=273°$, 16.7° for $T=250°$, 26.1° for $T=200°$, and 40.70° for $T=160°$. I make use of this decrease in temperature for gradually reducing the temperature to the desired degree by establishing a constant forced circulation of the air between the high-pressure space and the low-pressure space, causing the incoming air at high pressure to be cooled by giving up its heat to the outgoing air at low pressure on its way to the compressor and supplying additional air as required to keep up the pressure. I am enabled by this method to liquefy atmospheric air and to practically separate the oxygen from the nitrogen.

My invention will best be understood when described in connection with the annexed diagrammatic drawing, which represents one form of an apparatus for carrying out my process.

In the drawing, C designates a compressor of suitable construction by which the air is received through the T $a'$ and valve $z$ at a pressure $p'$ and compressed to a pressure $p^2$, the temperature being raised from $t'$ to $t^2$, which temperatures, however, may vary within certain limits.

K is the refrigerator, into which compressed air of the temperature $t^2$ passes from the compressor through the valved pipe $b$ and has its temperature reduced to $t^3$, said refrigerator consisting of a coil cooled by suitable means, such as cold brine or liquid ammonia.

G' is a counter-current apparatus consisting, as shown in the drawing, of two coiled pipes, one within the other, so as to leave an outer annular channel between the pipes and a central channel. These pipes should be of great length—say one hundred meters—and should be surrounded by non-conducting material, such as sheep's wool, so as to prevent transfer of heat to the outside and between the windings. The drawing shows a casing H for holding the non-conducting material. The upper end of the inner coiled tube of the counter-current apparatus G' is connected to the lower end of the coil of the cooler K by a pipe $c\ c'$, while the discharge-pipe $b$ of the compressor C is connected to the upper end of the cooling-coil, by which means communication is established from the discharge-opening of the compressor C through the cooler K to the top of the inner channel of the counter-current apparatus G'. The top of the channel formed between the inner and outer coiled pipe of the apparatus G' is connected to the suction end of the compressor C by means of the pipe $a$, T $a'$, and valve $z$.

P is a primary compressor drawing air from the outside through a pipe $d$ and valve $x$ and delivering it to the suction of the compressor C through the T $a'$ and valves $y$ and $z$, its object being to supply air at the initial high pressure $p'$.

V' is a closed vessel beneath the counter-current apparatus, into which vessel projects a nozzle N, attached to the lower end of the inner coiled pipe of the apparatus G', said nozzle being provided with a regulating-valve R'. As shown in the drawing, the vessel V' at or near its top communicates with the lower part of the space between the inner and outer coiled tubes of the counter-current apparatus G' by a pipe $k$.

The apparatus as so far described has a low-pressure channel extending from the vessel V' through the space between the pipes of the apparatus G' to the suction of the compressor C and a high-pressure channel extending from the discharge-valve of the compressor C through the cooler K and through the inner channel of the counter-current apparatus G' to the regulating-valve R'.

The operation of the apparatus so far described is as follows: By the action of the air-compressors the proper pressures are established within the apparatus, the difference of pressure between the high and low pressure spaces being regulated by the valve R'. For liquefying atmospheric air I have found a pressure of twenty-five atmospheres in the low-pressure space and seventy-five in the high-pressure space very effective. I have also found that cooling the air which leaves the compressor to a temperature $t^3$ of about 10° centigrade or less to be sufficient. The compressed air at the higher pressure of seventy-five atmospheres discharged into the vessel V' against the initial pressure of twenty-five atmospheres maintained therein has its temperature lowered to $t^4$ and passing at the reduced pressure of twenty-five atmospheres through the counter-current apparatus G' it absorbs heat from the incoming air at seventy-five atmospheres, so that if the apparatus were working to perfection the air passing to the counter-current apparatus at a temperature $t^3$ will have its temperature reduced to $t^4$. The air from the bottom of the counter-current apparatus G', now reduced to $t^4$, being discharged against the lower pressure in the vessel V' has its temperature still further reduced to $t^5$, the values of $t^4$ and $t^5$ gradually decreasing until a temperature below the critical point is reached. In the counter-current apparatus G' the gas reduced to the lower pressure $p'$ and the gas at the higher pressure $p^2$ and temperature $t^3$ travel in opposite directions and on opposite sides along the inner coiled pipe, which is formed of conducting material, so as to effect an exchange of temperatures, whereby the temperature in the vessel V' is finally lowered to or below the critical point, whereupon air is liquefied and collects at the bottom of the vessel V'. When the critical point is reached, a condition of permanency is established, and while a certain portion of the circulating air is condensed in the vessel V' a corresponding volume of fresh air is supplied by the compressor P, so as to maintain pressures, while in starting the temperature of the air in the apparatus is gradually lowered fresh air must also be supplied to keep up pressures. For further separating the nitrogen from the oxygen and for producing the latter also in the gaseous state when desired I use an evaporating vessel $V^2$ with an internal coil S and two counter-current apparatus $G^2$ and $G^3$, constructed similarly to G', of two coiled pipes, one within the other. A pipe $h\ h$ with a regulating-valve $R^2$ connects the lower parts of the vessels V' and $V^2$. The upper end of the vessel $V^2$ is connected to the lower end of the outer tube of the counter-current apparatus $G^2$, at the upper end of which an outlet for gaseous nitrogen is provided. From near the top of the vessel $V^2$ a pipe $i$ leads to the lower end of the outer pipe of the counter-current apparatus $G^3$ in such a manner that the overflow from the vessel $V^2$ is trapped on its way to the apparatus $G^3$. Air at the pressure $p^2$ and temperature $t^3$ is led by the valved pipe $e$, connected to cross $d$, to the upper end of the inner pipe of the counter-current apparatus $G^2$ and thence to coil S and also to the inner pipe of apparatus $G^3$ through pipe $f$ and valve $m$ and is carried off from the lower ends of apparatus $G^3$ and of coil S by the pipe $g$ to the lower end of the inner pipe of the apparatus G' above the regulating-valve R'. Within the vessel $V^2$ nitrogen is evaporated by heat abstracted from the air in coil S and is discharged through the upper end of the outer pipe of apparatus $G^2$. The liquid oxygen flows from near the top of vessel $V^2$ to the counter-current apparatus $G^3$, where it is evaporated and discharged in gaseous form from top of the outer pipe. When oxygen is wanted in liquid form, the apparatus $G^3$ is dispensed with and the liquid drawn from the lower part of the vessel $V^2$ through valve $n$. By the arrangement of the counter-current apparatus $G^2$ and $G^3$ and by carrying the cooled air back above the valve R' the heat required for evaporating nitrogen and oxygen is abstracted from the incoming air, so as to practically reduce the work to be done by the machine to what is due to the losses. The low temperatures obtained in the counter-current apparatus G² and G³ may, however, be employed for other purposes.

Of course the apparatus shown and described may be greatly varied or modified, my invention not being restricted to any details of construction. Thus, for instance, the fractional distillation of the liquid may be effected directly within the vessel V' instead of V² by placing the coil S into V' and then allowing the more volatile gases to escape through the space between the outer and inner tubes of the apparatus G'. The remaining counter-current apparatus G' and G³ may be so combined that the transfer of heat from the compressed air is effected through a single supply-pipe either by arranging three concentric tubes or by having two smaller tubes within a larger one. The gases leaving the apparatus may be repeatedly subjected to the process described to insure more perfect separation and purity. The compressors may be jacketed and cooled by water or cold brine, so that for small diameters and long strokes the air may be more or less cooled during compression. These modifications are readily understood without illustrations.

The word "condensation" as used in some of the claims means and comprehends the reduction of the volume of the gas to any desired degree.

What I claim as new is—

1. The process of refrigerating air or other gas consisting in compressing the gas, cooling it, expanding it through a suitable valve directly into a space maintained at a lower pressure, and causing the expanded cold gas to absorb heat to its full capacity from compressed gas about to be expanded, substantially as described.

2. The process of refrigerating and liquefying air or other gas consisting in compressing the gas, cooling it, expanding it through a suitable valve directly into a space maintained at a lower pressure and causing the expanded cold gas to absorb heat to its full capacity from compressed gas about to be expanded, whereby the gas is progressively cooled until its critical temperature is reached and a portion of it thereafter liquefies, substantially as described.

3. The process of liquefying atmospheric air which consists in causing compressed and cooled air to condense by the continuous expansion of itself around the outside of the conduit in which it is held and through which it passes until the temperature of liquid air is attained, substantially as described.

4. The process consisting in causing a compressed gaseous mixture to be expanded in such manner that its degree of temperature will be diminished, causing the cold expanded mixture to absorb heat to its full capacity from the gases about to be expanded, continuing these steps, whereby the mixture will be liquefied, and liberating the more volatile gas from the resulting liquid by causing the liquid to absorb heat from the mixture about to be expanded, substantially as described.

5. The process consisting in causing compressed air to be expanded in such manner that its degree of temperature will be diminished, causing the cold expanded air to absorb heat to its full capacity from the air about to be expanded, continuing these steps, whereby the mixture will be liquefied, causing the resulting liquid to absorb heat from air about to be expanded, and causing the more volatile gas thus liberated, (nitrogen) to absorb heat from the air about to be expanded, substantially as described.

6. The process consisting in causing compressed air to be expanded in such manner that its degree of temperature will be diminished, causing the cold expanded air to absorb heat to its full capacity from the air about to be expanded, continuing these steps, whereby the air will be liquefied, causing the resulting liquid to absorb heat from the air about to be expanded, causing the nitrogen thus liberated to absorb heat from the air about to be expanded, and causing the less volatile liquid remaining (oxygen), to absorb heat from the air about to be expanded, substantially as described.

7. The process consisting in causing compressed air to be expanded in such manner that its degree of temperature will be diminished, causing the cold expanded air to absorb heat to its full capacity from the air about to be expanded, continuing these steps, whereby the gases will be liquefied, causing the resulting liquid to absorb heat from the air about to be expanded, causing the nitrogen thus volatilized to absorb heat from the air about to be expanded, causing the liquid oxygen thus separated from nitrogen to absorb heat from air about to be expanded, and causing gaseous oxygen thus liberated to absorb heat from air about to be expanded, substantially as described.

8. The process of separating air into two parts, one rich in oxygen, and the other poor in oxygen; consisting in liquefying the air and subjecting the liquid to fractional distillation by heat derived from compressed air about to be liquefied, substantially as set forth.

9. The process of separating air into two parts, one rich in oxygen, and the other poor in oxygen; consisting in liquefying the air, subjecting the liquid to fractional distillation by heat derived from compressed air about to be liquefied, and utilizing the distilled nitrogen to cool compressed air about to be liquefied, substantially as set forth.

10. The process of separating air into two parts, one rich in oxygen and the other poor in oxygen; consisting in liquefying the air, subjecting the liquid to fractional distillation by heat derived from compressed air about to be liquefied, and utilizing the distilled oxygen to cool compressed air about to be liquefied, substantially as set forth.

11. The fractional distillation of a liquefied mixed gas by heat derived from previously-cooled similar gas undergoing condensation at a higher pressure.

12. A process for separating air or other mixed gas into its constituent gases, consisting in liquefying the gas and subjecting the liquid to fractional distillation by heat derived from previously-cooled gas undergoing condensation at a higher pressure.

13. A process for separating air or other mixed gas into its constituent gases, consisting in liquefying the gas and subjecting the liquid to fractional distillation by heat derived from previously-cooled similar gas undergoing condensation at a higher pressure, and wholly or partly maintaining the supply of liquid by liquid gas thus obtained.

14. A process for separating air or other mixed gas into its constituent gases, consisting in liquefying the gas and subjecting the liquid to fractional distillation by heat derived from previously-cooled gas undergoing condensation at a higher pressure and utilizing the products of distillation to cool gas about to be liquefied.

In testimony whereof I have signed my name to this specification in the presence of two subscribing witnesses.

CARL LINDE.

Witnesses:
  EMIL WENZEL,
  ALEX NEGELE.